United States Patent [19]
Taku

[11] Patent Number: 5,740,486
[45] Date of Patent: Apr. 14, 1998

[54] CAMERA HAVING EMERGENCY CARTRIDGE TAKING-OUT FUNCTION

[75] Inventor: Masakazu Taku, Kanagawa-ken, Japan

[73] Assignee: Canon Kabushiki Kaisha, Tokyo, Japan

[21] Appl. No.: 818,243

[22] Filed: Mar. 13, 1997

Related U.S. Application Data

[63] Continuation of Ser. No. 410,745, Mar. 27, 1995, abandoned.

[30] Foreign Application Priority Data

Mar. 31, 1994 [JP] Japan ................................ 6-063524

[51] Int. Cl.$^6$ ............................ G03B 1/00; G03B 17/02
[52] U.S. Cl. ..................... 396/411; 396/413; 396/535; 396/543
[58] Field of Search .................................. 354/212, 214, 354/285; 396/411, 413, 535, 543

[56] References Cited

U.S. PATENT DOCUMENTS 4,363,547  12/1982  Hashimoto et al. ................. 354/212
4,469,421   9/1984  Kamata .............................. 354/212
4,564,279   1/1986  Sitzler et al. ..................... 354/214
4,714,335  12/1987  Malloy Desormeaux .............. 354/214
5,307,101   4/1994  Tanii et al. ....................... 354/173.1
5,473,401  12/1995  Tsunefuji .......................... 354/288

Primary Examiner—Cassandra C. Spyrou
Assistant Examiner—Daniel Chapik
Attorney, Agent, or Firm—Robin, Blecker, Daley and Driscoll

[57] ABSTRACT

A camera, an apparatus, or a device adapted for the camera or the apparatus, arranged to use an image recording medium cartridge, is provided with a cover for closing an opening part from which the cartridge is to be removed from the camera or the apparatus, a first part arranged to automatically return an image recording medium to the cartridge loaded on the camera or the apparatus, and a second part arranged to change at least between a first state in which no force is imparted to a member for moving the image recording medium and a second state in which a force is allowed to be imparted to the member for moving the image recording medium and to allow the image recording medium to be returned to the cartridge without using the first part when the second part is in the second state, the second part being changeable at least between the first state and the second state when the opening part is closed with the cover.

61 Claims, 7 Drawing Sheets

CAMERA HAVING EMERGENCY CARTRIDGE TAKING-OUT FUNCTION

This is a continuation application under 37 CFR 1.62 of prior application Ser. No. 08/410,745, filed Mar. 27, 1995 now abandoned.

BACKGROUND OF THE INVENTION

1. Field of the Invention

This invention relates to an improvement on a camera having a cartridge taking-out function.

2. Description of the Related Art

While it has been practiced to replace a film in use by opening the back lid of a camera according to the conventional method, this method has been changed for a camera recently proposed. The camera recently proposed is arranged as follows: When a film cartridge which is of the type not having the leader part of the film protruding to the outside, for example, is inserted into an opening part of a cartridge chamber of the camera body, the film cartridge is automatically set in a predetermined position within the cartridge chamber. A part of the film is then automatically pulled out from the cartridge. Further, the opening part is automatically closed with a lid member. With the camera thus loaded with the film cartridge, when an instruction for taking out the film cartridge is given, for example, by operating a manual switch after completion of taking all shots, the lid member is automatically opened and the film cartridge is automatically ejected from the cartridge chamber.

In the case of the camera of the kind using the film cartridge of the above-stated type as a casing for an image recording medium, film loading, ejecting, winding and rewinding actions and opening and closing actions on the lid member of the film cartridge chamber are arranged to be automatically carried out. Therefore, if the battery of a power supply is consumed or if some trouble happens with a driving circuit or the like while the film cartridge is loaded within the cartridge chamber of the camera body, it might become impossible to take out the film cartridge from the camera body.

SUMMARY OF THE INVENTION

In accordance with one aspect of this invention, a camera or an apparatus, or a device for the camera or the apparatus, which is adapted for use of an image recording medium cartridge, is provided with a cover for closing an opening part from which the cartridge is to be removed from the camera, the apparatus or the device, first means for automatically returning an image recording medium to the cartridge which is loaded on the camera or the apparatus, and second means arranged to change between a first state in which no force is imparted to a member for moving the image recording medium and a second state in which a force is allowed to be imparted to the member for moving the image recording medium and to allow the image recording medium to be returned to the cartridge without using the first means when the second means is in the second state, the second means being changeable at least between the first state and the second state when the opening part is closed with the cover. The camera, the apparatus or the device is arranged such that, even in a case where it becomes impossible to bring the image recording medium back to the cartridge by the first means, the image recording medium can be brought back to the cartridge.

The above and other aspects and features of this invention will become apparent from the following detailed description of embodiments thereof taken in conjunction with the accompanying drawings.

DETAILED DESCRIPTION OF THE PREFERRED EMBODIMENTS

Figure 1:
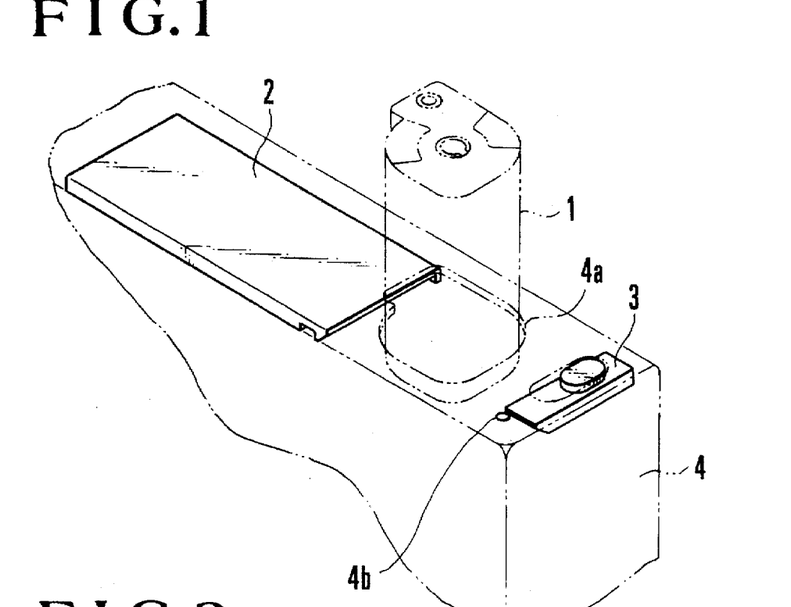
FIG. 1 is an oblique view showing the appearance of a camera which is an embodiment of this invention and is shown in a state obtained before a film cartridge is loaded within the body of the camera.
Figure 2:
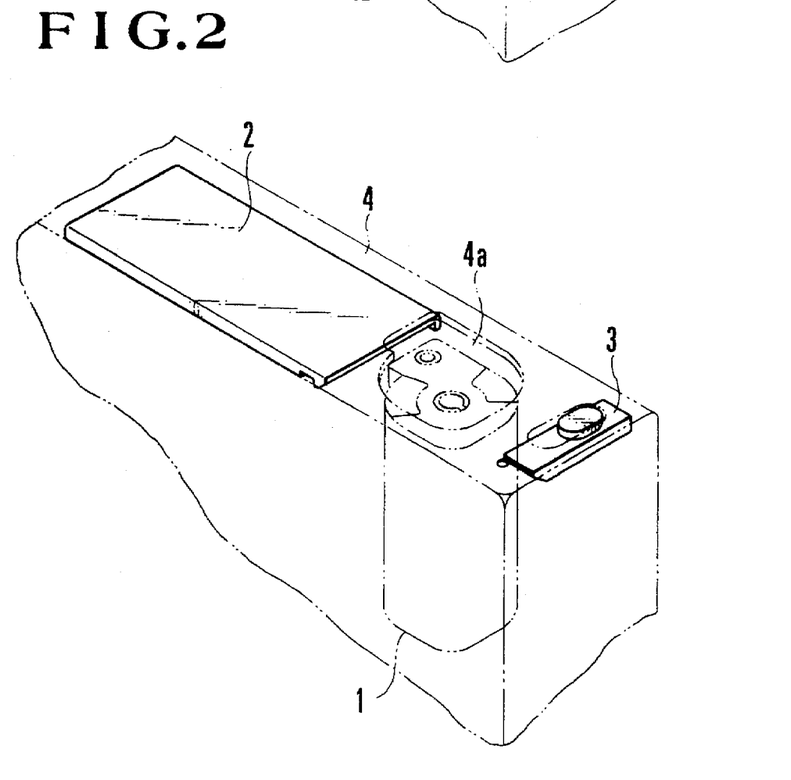
FIG. 2 is an oblique view showing the appearance of the camera of FIG. 1 in a state obtained after the film cartridge is loaded within the camera body.

FIGS. 1 and 2 are oblique views showing the appearance of a camera arranged as an embodiment of this invention. In FIG. 1, a film cartridge 1 is shown in a state of being about to be inserted into an inserting opening 4a of a cartridge chamber. FIG. 2 shows the film cartridge 1 in a state of having been automatically loaded by means of a roller which will be described later herein, A sliding lid 2 is arranged to automatically open and close the inserting opening 4a. An opening-and-closing knob 3 is provided for automatically ejecting the film cartridge 1 by opening the sliding lid 2. Reference numeral 4 denotes a camera body cover.

Figure 3:
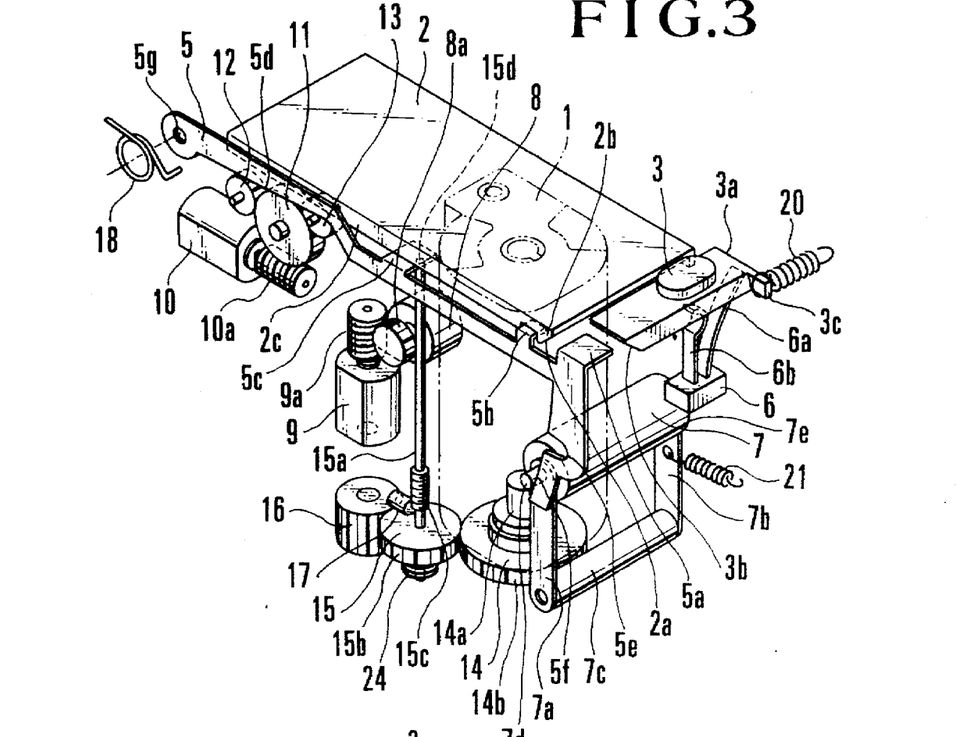
FIG. 3 is an oblique view showing the internal arrangement of the camera of FIG. 1 in a state obtained with an operation knob not operated.
Figure 11:
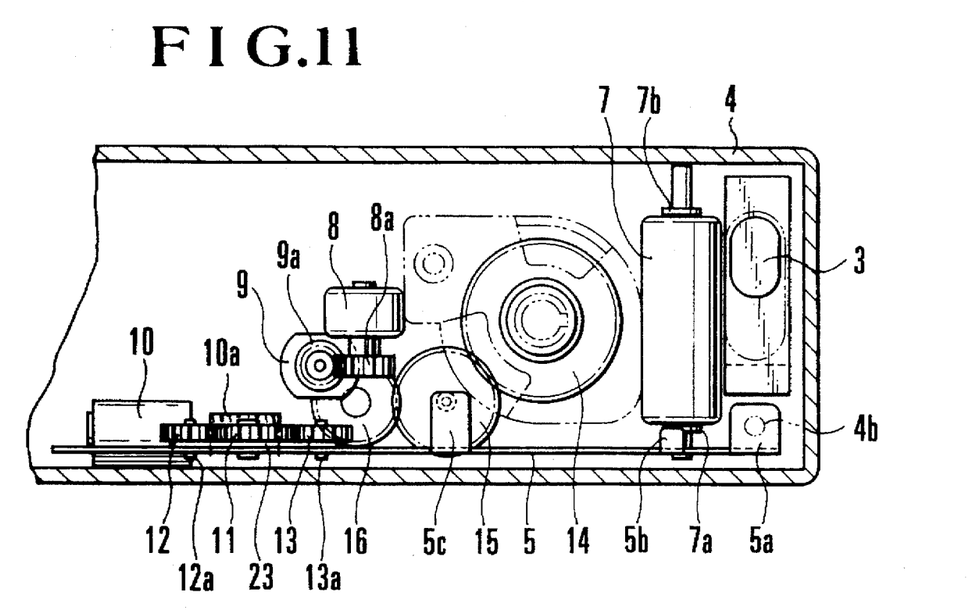
FIG. 11 is a plan view showing the arrangement of the camera of FIG 1.

FIG. 3 is an oblique view showing an internal arrangement of the camera shown in FIG. 1. The film cartridge 1 which has been used for taking all shots is within the cartridge chamber of the camera body cover 4. A film has been contained in the film cartridge 1 and the film cartridge 1 is ready to be taken out. FIG. 11 shows in a plan view the arrangement of parts shown in FIG. 3.

Referring to FIGS. 3 and 11, the opening-and-closing knob 3 is urged by a spring 20 at its hook part 3c in such a way as to hold and prevent, by a rear end face 3a of the knob 3, a movable piece 6a of a switch 6 from coming into contact with a fixed piece 6b of the switch 6. A slanting face 3b is formed at the fore end of the opening-and-closing knob 3 in the direction of sliding. The slanting face 3b is arranged to push down an abutting face 5a of a stop lever 5 (permitting, setting or operation device) when the opening-and-closing knob 3 slides.

The stop lever 5 is supported to be swingable on a hole 5g and is constantly urged by a torsion spring 18 to swing counterclockwise. A lock part 5b of the stop lever 5 is pushed by the urging force into a lock claw 2b of the sliding lid 2 to lock the sliding lid 2 when the sliding lid 2 is closed. At a middle part of the stop lever 5, there is formed a shaft pushing-down part 5c. When the stop lever 5 swings clockwise more than a predetermined degree, the shaft pushing-down part 5c pushes down a shaft end part 15d of a gear 15 against the force of a spring 24 to disengage the gear 15 from a fork gear 14. Further, an end face 5d of the stop lever 5 is arranged to abut, according to the swing of the stop lever 5, on shafts 12a and 13a of sliding lid opening-and-closing planet gears 12 and 13, which are connected to each other by a planetary lever 23. An interlocked motion of the planet gear 12 or 13 with a rack gear part 2c of the sliding lid 2 is thus controlled by means of the stop lever 5. The stop lever 5 is provided further with an arcuate face 5f. The arcuate face 5f abuts on a shaft 7d of a driven roller 7 which is provided for pulling-in and ejecting the cartridge 1. When the stop lever 5 is swung clockwise more than a predetermined degree, the shaft 7d comes into and engages a cutout part 5e of the stop lever 5 to cancel the contacting pressure of the roller 7 on the cartridge 1.

The driven roller 7 is arranged to be freely rotatable on the shaft 7d. A roller part 7e of the driven roller 7 is made of rubber and is arranged to increase friction when the roller 7 is pushed into contact with the shell of the cartridge 1. The cartridge 1 is arranged to be pushed into or driven out by the rotation of a driving roller 8 which is disposed on a side opposite to the driven roller 7 across the cartridge 1. Further, the driven roller 7 is provided with arm parts 7a and 7b which are interconnected by a shaft 7c. The rubber roller part 7e of the driven roller 7 is thus arranged to be revolvable on the shaft 7c and is constantly urged to move clockwise by a spring 21.

The fork gear 14 is arranged to engage the cartridge 1 at a fork part 14a and to drive the film of the cartridge to be pushed out and rewound. For this purpose, a driving force of a motor which is not shown is transmitted to the fork gear 14 through gears 16 and 15. The gear 15 is rotatable on a shaft 15a and has a gear part 15b arranged to be vertically movable with the shaft 15a. Normally the gear part 15b is urged to move upward by a spring 24 in such a manner that the driving force of the gear 16 is transmitted to the gear part 14b of the fork gear 14 through the gear part 15b of the gear 15.

Figure 6:
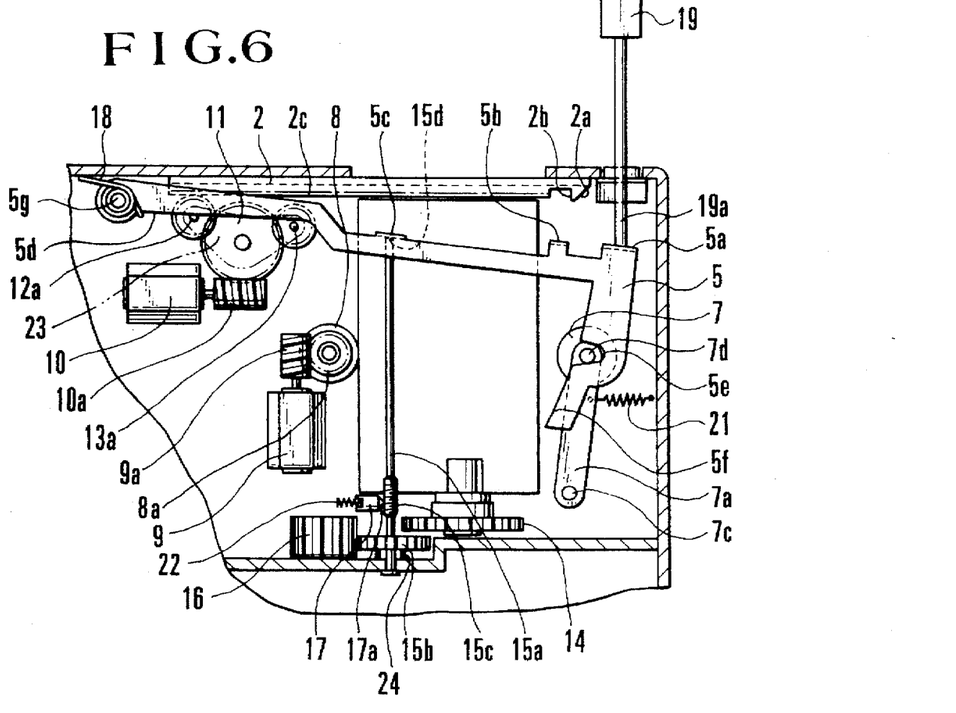
FIG. 6 is a vertical sectional view of essential parts in the state shown in FIG. 5.

A thread part 15c is formed on the shaft 15a. A claw member 17, on the other hand, is urged to move toward the thread part 15c by a spring 22 as shown in FIG. 6. When the gear 15 is pushed down more than a predetermined extent, a fore end 17a of the claw member 17 comes to engage the thread part 15c of the shaft 15a. Further, since the claw member 17 is arranged to be slidable in the direction of the urging force of the spring 22, the claw member 17 is movable only in that direction and is not movable in any other direction.

Figure 4:
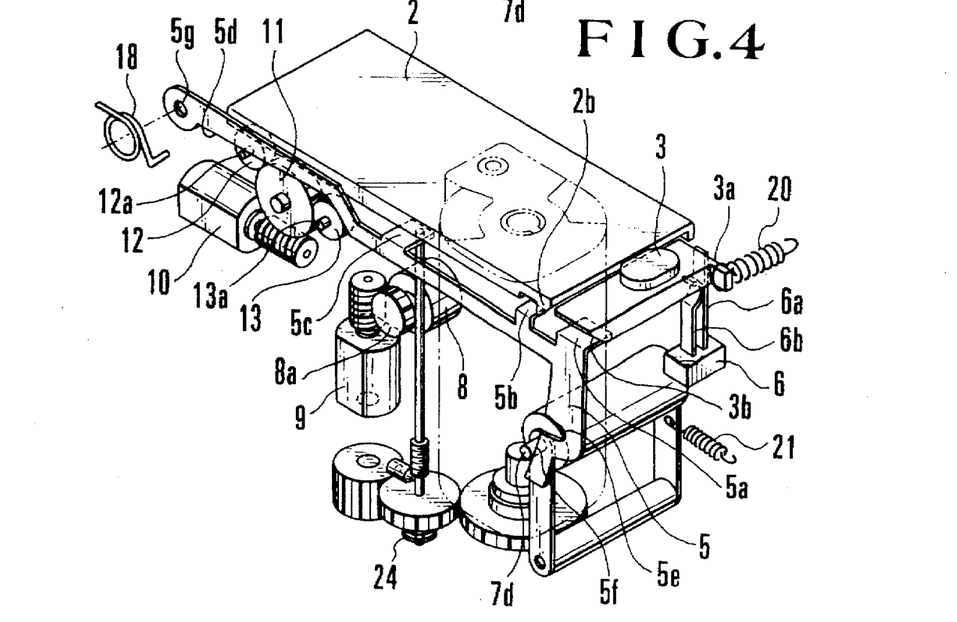
FIG. 4 is an oblique view showing the internal arrangement of the camera of FIG. 1 in a state obtained with the operation knob operated.

In the arrangement described above, when the opening-and-closing knob 3 is slid against the force of the spring 20 in an attempt to take out the cartridge 1 which is in a state as shown in FIG. 3, there is obtained a state which is shown in FIG. 4. In other words, the sliding operation on the opening-and-closing knob 3 causes the abutting face 5a of the stop lever 5 to be pushed down by the slanting face 3b. The stop lever 5 is caused to swing clockwise against the force of the torsion spring 18. This swing lowers the position of the lock part 5b which has been inside of the lock claw 2b of the sliding lid 2. The sliding lid 2 is unlocked to become freely slidable. The opening-and-closing knob 3 further slides and moves in the direction of releasing the movable piece 6a of the switch 6 from a state of being pushed to allow the movable piece 6a to come into contact with the fixed piece 6b with the sliding lid 2 in a state of having been unlocked.

The contact of the movable piece 6a and the fixed piece 6b turns the switch 6 on to cause a control circuit which is not shown to supply power to a motor 10. A sun gear 11 is driven clockwise. Then, the planet gears 12 and 13 revolve clockwise. Therefore, the planet gear 13 for closing moves from a state shown in FIG. 3 to a state shown in FIG. 4 and thus comes to disengage from the rack part 2c of the sliding lid 2. The planet gear 12 for opening moves from its state of FIG. 3 to a state of FIG. 4 to be in mesh with the rack part 2c.

With the plant gear 12 for opening thus coming to intermesh with the rack part 2c, further driving by the motor 10 causes the sliding lid 2 to be driven in the direction of opening. When the sliding lid 2 is fully opened, a switch which is not shown is closed to turn off the supply of power to the motor 10. At the same time, a cartridge ejecting motor 9 is driven. The driving roller 8 connected to a gear 8a is rotated counterclockwise to eject the cartridge 1. Since the stop lever 5 is then in a state of being pushed down only by the slanting face 3b of the opening-and-closing knob 3, the end face 5d of the stop lever 5 is not engaging the shaft 12a of the planet gear 12. The shaft pushing-down part 5c is also not pushing an end face 15d of the shaft 15a of the gear 15. Further, the shaft 7d of the driven roller 7 is above the arcuate face 5f to have the pinching pressed contact forces of the driving roller 8 and the driven roller 7 kept on the cartridge 1. Therefore, the cartridge 1 comes to be ejected by the rotation of the driving roller 8.

Figure 7:
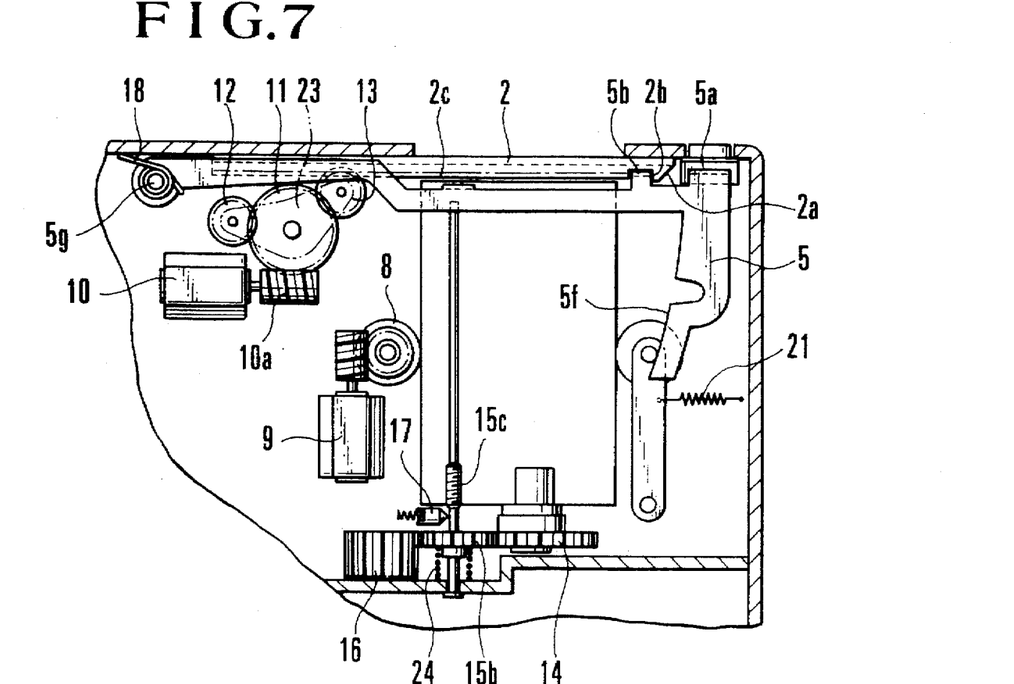
FIG. 7 is a vertical sectional view of essential parts in the state shown in FIG. 3.
Figure 8:
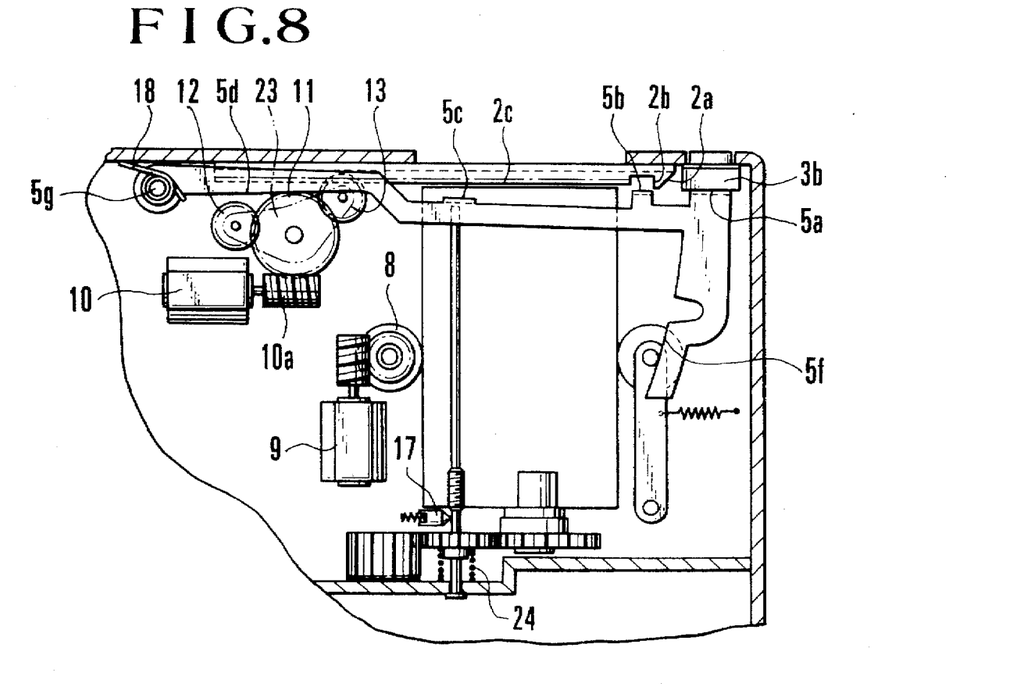
FIG. 8 is a vertical sectional view of essential parts in the state shown in FIG. 4.

The internal arrangement of the camera of FIG. 1 is described again with reference to FIGS. 7 to 13 as follows. FIG. 7 shows the camera in the same state as in FIG. 3. In this state, the cartridge 1 is ready to be taken out with the film contained therein. FIG. 8 shows a state obtained with the abutting face 5a of the stop lever 5 pushed down to cause the stop lever 5 to swing clockwise on the shaft 5g by sliding the opening-and-closing knob 3 in the state of FIG. 4. With the stop lever 5 thus caused to swing clockwise, the lock part 5b is retracted from the lock claw 2b to unlock the sliding lid 2.

Figure 9:
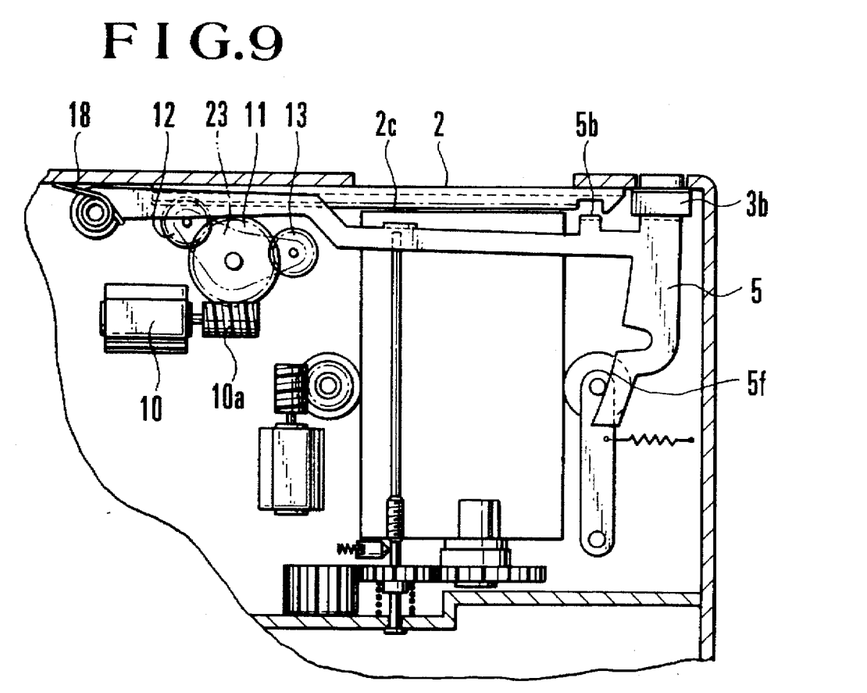
FIG. 9 is a vertical sectional view showing an unlocking action on a sliding lid of the camera of FIG. 1.
Figure 10:
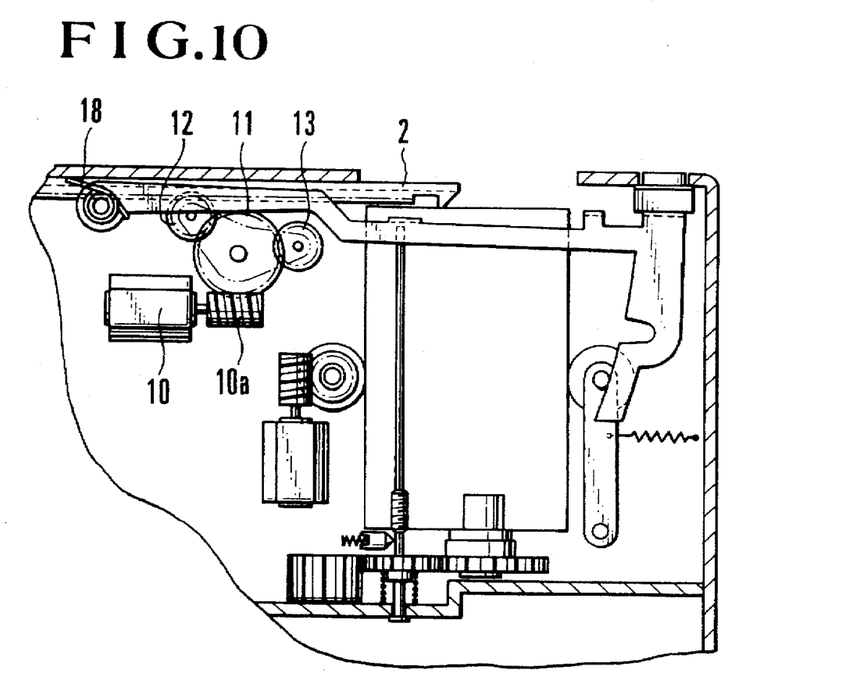
FIG. 10 is a vertical sectional view showing an opening action on the sliding lid of the camera of FIG. 1.
Figure 12:
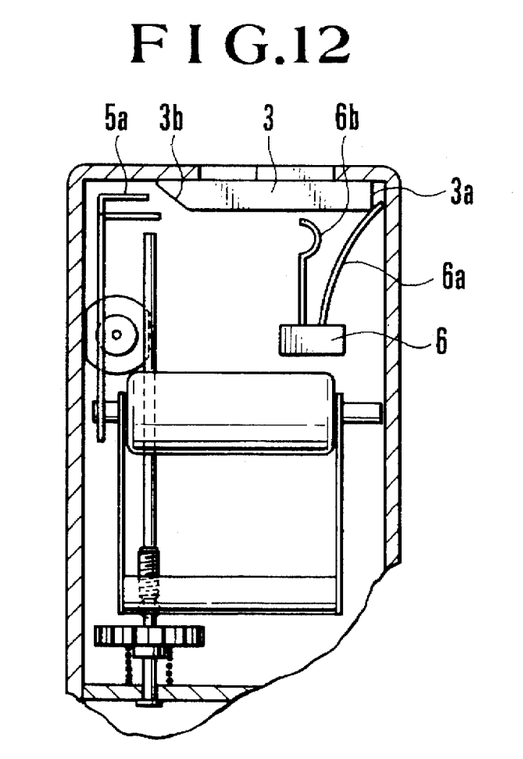
FIG. 12 is a sectional view showing a state of a switch shown in FIG. 3.
Figure 13:
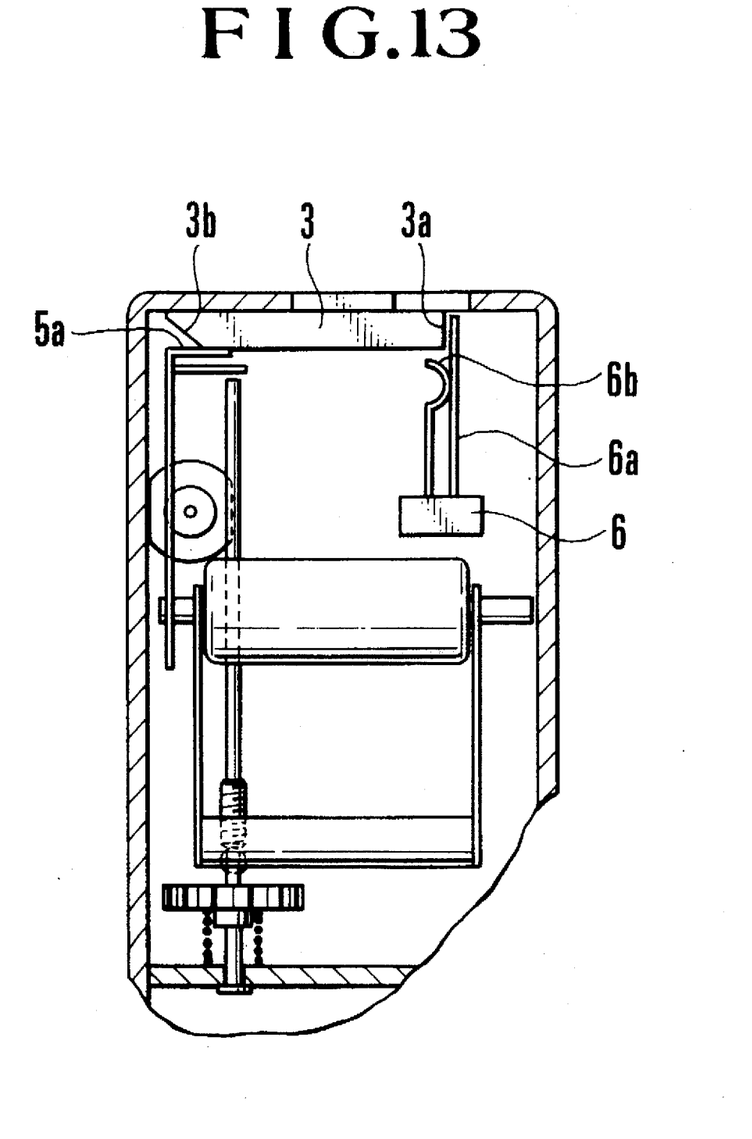
FIG. 13 is a sectional view showing another state of the switch shown in FIG. 4.

Then, the state of FIG. 12 shifts to a state as shown in FIG. 13. The movable piece 6a of the switch 6 is no longer pushed by the rear end face 3a of the opening-and-closing knob 3 and is thus allowed to come into contact with the fixed piece 6b. The switch 6 is thus turns on to allow power to be applied to the motor 10. The state of FIG. 8 shifts to a state as shown in FIG. 9. The sun gear 11 rotates clockwise. The planet gear 12 for opening then engages the rack gear part 2c of the sliding lid 2. When the sun gear 11 further rotates, the state of FIG. 9 shifts to a state as shown in FIG. 10. The sliding lid 2 then begins to open.

After the cartridge 1 is ejected and taken out, when another cartridge 1 which contains a new film is inserted, the driving roller 8 is caused to rotate clockwise, i.e., reverse to the direction of rotation made in ejecting the cartridge, to complete insertion of the cartridge 1. Upon completion of insertion, a switch which is not shown turns on. The motor 9 is caused to stop driving. The motor 10 which is provided for driving the sliding lid 2 in the closing direction is caused to rotate the sun gear 11 counterclockwise, as shown in FIG. 7. The closing planet gear 13 then comes to mesh with the rack gear part 2c of the sliding lid 2. The sliding lid 2 is moved to the right. At this moment, the lock part 5b of the stop lever 5 is in a position as shown in FIG. 7. However, the sliding movement of the sliding lid 2 causes its slanting face 2a to abut on the lock part 5b. The stop lever 5 is then pushed down by a further movement of the sliding lid 2. When the lock claw 2b reaches the lock part 5b, the stop lever 5 is again caused to swing counterclockwise by the urging force of the torsion spring 18 until the lock part 5b comes into the lock claw 2b to bring about again a locked state as shown in FIG. 7.

Figure 5:
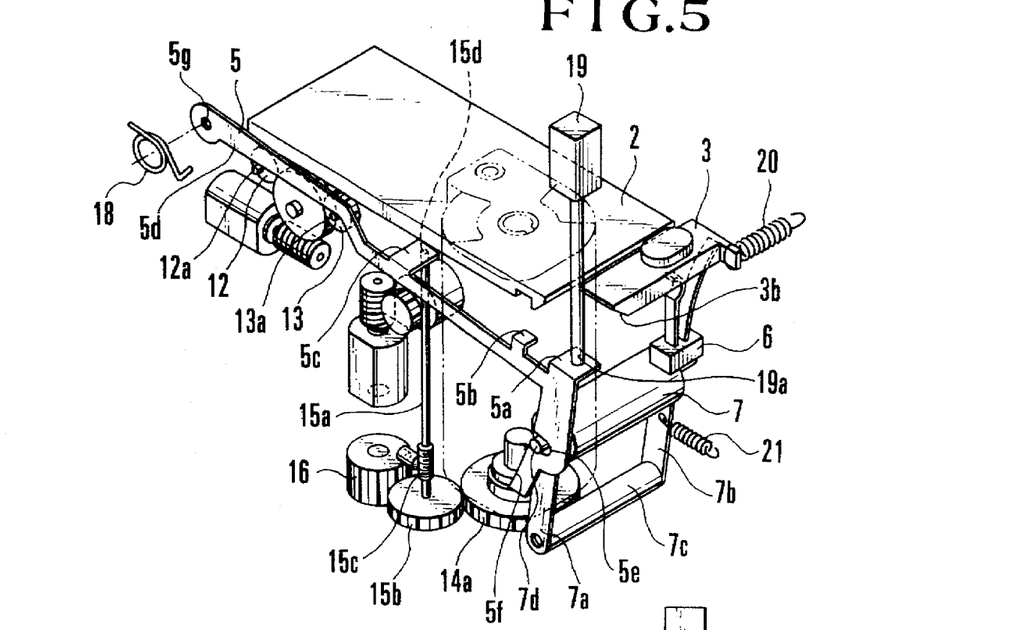
FIG. 5 is an oblique view showing the internal arrangement of the camera of FIG. 1 in a state obtained with an emergency operation performed on the camera.

FIGS. 5 and 6 show in an oblique view and a vertical sectional view the internal arrangement of the camera of FIG. 1 in a state obtained under an abnormal condition. All the states described in the foregoing are obtained in normal operable conditions and also with electric energy available sufficiently from a battery which is employed as a power source.

However, in cases where the electric system happens to be out of order to render the camera completely inoperable due to some abnormality of a control IC or a consumed state of the battery or the like, the camera described above shows an advantageous feature.

More specifically, the camera is arranged such that, in such an emergency, the function of the motor drive mechanism is canceled by inserting a long and thin bar 19a having an enlarged end 19 into a hole 4b which is provided in the camera body cover 4 as shown in FIG. 1. The film cartridge 1 then can be manually taken out. When the long and thin bar 19a is pushed into the camera body from the hole 4b of the camera body cover 4 as shown in FIGS. 5 and 6, the abutting face 5a of the stop lever 5 which is normally pushed by the slanting face 3b of the opening-and-closing knob 3 is pushed down. With the long and thin bar 19a inserted, it causes the shaft 7d of the driven roller 7 which has been abutting on the arcuate face 5f of the stop lever 5 to come into the cutout part 5e. When it becomes impossible to push in the stop lever 5 any further due to the cutout part 5e and the shaft 7d, preparation for an emergency taking-out operation on the cartridge 1 is completed. After that, even if the long and thin bar 19a is pulled out of the hole 4b, the state shown in FIG. 5 is maintained against the force of the torsion spring 18 because the stop lever 5 is hooked on the shaft 7d at the cutout part 5e. As shown in FIGS. 5 and 6, the shaft 7d is arranged to engage the cutout part 5e for the purpose of preventing the stop lever 5 from swinging clockwise. In addition to that, while the shell of the cartridge 1 has been sandwiched with pressure in between the driving roller 8 and the driven roller 7, the driven roller 7 is retracted. Further, since the stop lever 5 is kept in a state of having been swung clockwise, the lock part 5b is away from the lock claw 2b of the sliding lid 2. Besides, since the end face 5d of the stop lever 5 has been moved further than its normal position to engage the shafts 12a and 13a of the planet gears 12 and 13 and is thus set in a position where it never meshes with the rack gear part 2c of the sliding lid 2 as shown in FIG. 6, in this instance, the sliding lid 2 becomes completely free and can be easily opened and closed by hand.

With the stop lever 5 coming to the position as shown in FIGS. 5 and 6, the shaft pushing-down part 5c comes down more than a predetermined extent and thus comes to push the fore end 15d of the shaft 15a downward. Then, since the shaft 15a, the thread part 15c and the gear part 15b are unified in one body, the pushing-down of the shaft 15a against the force of the spring 24 causes the fore end 17a of the claw member 17 to abut on the thread part 15c. With the shaft 15a pushed down further, the fore end 17a of the claw member 17 comes to mesh with the groove of the thread part 15c. As a result, the shaft 15a is locked to its position as shown in FIG. 6 in a state of suppressing a reaction force of the spring 24.

In this state, the fork gear 14 disengages the gear 15 while the gear 15 remains in mesh with the gear 16 which is connected to a film feeding motor (not shown) through a reduction system. Therefore, the fork gear 14 and the fork part 14a can be freely rotated as desired. In the case of emergency taking-out after the film is stowed inside of the cartridge 1, it is sufficient just to set the cartridge 1 and the sliding lid 2 free. However, in a case where the film still remains outside of the cartridge 1 and has not been completely rewound, the film must be stowed inside of the cartridge 1, after the sliding lid 2 is opened, by manually rotating a shaft of the cartridge 1 on one side opposite to the other side on which the cartridge 1 is engaging the fork. However, it would be impossible to manually rotate the shaft if a gear of the reduction system is in mesh with the fork gear 14. In that event, the fork gear 14 must be set free. It goes without saying that the manual film rewinding operation on the cartridge 1 must be carried out within a dark room.

Next, in the event of a malfunction due to the exhaustion of battery energy, the battery is replaced with a new battery after the film cartridge 1 is taken out by the above-stated arrangement for emergency taking-out. After replacement of the battery, the opening-and-closing knob 3 is operated once to turn on and off the switch 6 which consists of the movable piece 6a and the fixed piece 6b. A signal thus formed by the switch 6 is detected by a control IC. The control IC then causes the film feeding motor which is not shown to rotate in the direction of film rewinding. The rotation of the motor causes the gear 16 to rotate. The rotation of the gear 16 in turn causes the gear part 15b which is in mesh with the gear 16 to rotate in the direction of rewinding. The thread part 15c which is in mesh with the fore end 17a of the claw member 17 then rotates. Since the direction of thread is arranged to cause the gear part 15b, the shaft 15a and the thread part 15c to move upward, the fore end 15d of the shaft 15a is moved to push upward the shaft pushing-down part 5c of the stop lever 5. This motion causes the stop lever 5 to swing counterclockwise on its shaft 5g. The slanting face of the cutout part 5e of the stop lever 5 pushes the shaft 7d of the driven roller 7 against the force of the spring 21. The driven roller 7 is thus pushed to revolve counterclockwise on the shaft 7c. When the shaft 7d moves up to the arcuate face 5f, the stop lever 5 is reset into a state shown in FIG. 7 by the torsion spring 18.

Further, after the thread part 15c is completely moved above the claw member 17, the gear part 15b and the thread part 15c are also brought into the state of FIG. 7 by the urging force of the spring 24. As a result, the gear part 15b and the fork gear 14 are again kept in mesh with each other. When this state is obtained, as apparent from FIG. 7, the thread part 15c and the claw member 17 are located completely away from each other. Therefore, the gear 15 is never caused to move up and down by the normal and reverse rotation of the gear part 15b, so that the transmission of a driving force between the gear 16 and the fork gear 14 can be adequately accomplished. The camera is thus completely reset from the emergency taking-out state set due to the exhaustion of the power supply battery or a malfunction. After that, the camera again can be driven in a normal manner.

While the embodiment described is arranged to retract the driven roller in the event of the emergency cartridge taking-out operation, the arrangement of course may be changed either to retract the driving roller or to retract both the driving and driven rollers.

In the embodiment described, the lock member which locks to a closed state the sliding lid provided for opening and closing a cartridge chamber is arranged to be manually unlocked by means of the opening-and-closing knob. However, this arrangement may be changed to have the sliding lid electrically unlocked with a sliding lid opening-and-closing motor. In other words, the lock member may be arranged to be manually shifted to an unlocking position by the arrangement of the embodiment only in the event of an abnormal state.

Further, the embodiment is arranged to retract the cartridge pulling-in roller. However, the roller retracting arrangement may be changed to disconnect an intermediate driving force transmission system.

While the embodiment described is arranged to disconnect the system of transmitting a driving force to the fork part, this arrangement may be changed to retract the fork part itself to a position where the fork part never engages the cartridge.

Further, while the embodiment described is arranged to allow the film to be rewound back to the inside of the cartridge by opening the cartridge chamber in the event of an abnormal state, the arrangement may be changed to carry out such film rewinding by operating from outside some member that can be caused from outside to engage the shaft of the cartridge. Such modification has an advantage in that the film can be prevented from being exposed to light because the film can be rewound without opening the cartridge chamber.

In the case of the embodiment described, the transmitting function of each driving system is arranged to be rendered inoperative in taking out the cartridge in the event of an abnormal state. However, this arrangement may be changed, if necessary, to take out the cartridge without rendering the transmission system inoperative.

In accordance with this invention, the cartridge loading direction is not limited to the direction of the embodiment described, which is arranged to load the cartridge by inserting it from the bottom side of the the camera body. The camera may be arranged to have the cartridge loaded by inserting it, for example, from above or from one side of the camera body.

Further, in accordance with this invention, the cartridge does not have to be arranged to be axially inserted as in the case of the embodiment described.

This invention is applicable even to an apparatus using an image recording medium other than film.

Further, this invention applies to cartridges of any type other than the type of cartridge used by the embodiment described, a cartridge containing an image recording medium other than a film, a cartridge of a different kind, a loading matter other than a cartridge such as a battery, etc.

Further, this invention also applies to a case where the whole or a part of the embodiment forms an apparatus or is arranged to be coupled with some other device or to form a component element of an apparatus.

Further, this invention is applicable also to cameras of varied kinds including a single-lens reflex camera, a lens-shutter type camera, a video camera, to an optical apparatus or some other apparatus other than a camera or to component elements of such apparatuses.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera adapted for use of an image recording medium cartridge, comprising:
    a) a cover for closing an opening part for removing said cartridge from the camera;
    b) a returning device which automatically return an image recording medium to the cartridge which is loaded on the camera; and
    c) a setting device which sets state in which the image recording medium can be returned-to the cartridge without using said returning device, said setting device inhibiting opening of said cover when said setting device is not in said state.

2. A camera according to claim 1, wherein the image recording medium includes a film.

3. A camera according to claim 1, wherein said returning device includes a motor.

4. A camera according to claim 1, wherein said returning device includes means for using electrical energy as a drive source.

5. A camera according to claim 1, wherein said setting device includes means for permitting an operation for setting said state to be performed exteriorly of the camera.

6. A camera according to claim 1, wherein said setting device includes means for permitting manually setting said state.

7. A camera according to claim 1, wherein said change device includes means for effecting said inhibiting of opening of said cover when said change device is in said second state and for not inhibiting opening of said cover when said change device is in said first state.

8. A camera according to claim 1, wherein said setting device includes means for cutting off a function of transmitting a driving force to said cover.

9. A camera according to claim 8, further comprising third means for cutting off a driving force transmitting function of said returning device.

10. A camera according to claim 9, further comprising fourth means for cutting off a driving force transmitting function for at least one of moving the cartridge into and out of the camera.

11. A camera according to claim 8, further comprising third means for cutting off a driving force transmitting function for at least one of moving the cartridge into and out of the camera.

12. A camera according to claim 1, further comprising third means for cutting off a driving force transmitting function of said returning device.

13. A camera according to claim 12, further comprising fourth means for cutting off a driving force transmitting function for at least one of moving the cartridge into the camera and removing the cartridge from the camera.

14. A camera according to claim 1, further comprising third means for cutting off a driving force transmitting function for at least one of moving the cartridge into the camera and removing the cartridge from the camera.

15. A camera according to claim 1, further comprising means for automatically releasing said state.

16. A camera adapted for use of an image recording medium cartridge having an image recording medium, comprising:
   a) an opening device for automatically opening an opening part for removing the cartridge from said camera; and
   b) an operation device which renders said opening part openable without using said opening device.

17. A camera according to claim 16, wherein the image recording medium includes a film.

18. A camera according to claim 16, wherein said opening device includes a motor.

19. A camera according to claim 16, wherein said opening device includes means for using electric energy as a drive source.

20. A camera according to claim 16, wherein said operation device includes means for permitting an operation to be performed exteriorly of the camera.

21. A camera according to claim 16, wherein said operation device includes means for permitting a manual operation.

22. A camera according to claim 16, further comprising third means for inhibiting an opening action on said opening part, wherein said operation device includes means for rendering said third means incapable of inhibiting the opening action on said opening part.

23. A camera according to claim 16, wherein said operation device includes means for cutting off a driving force transmitting function of said opening device.

24. A camera according to claim 23, further comprising third means for cutting off a driving force transmitting function for at least one of moving the cartridge into the camera and removing the cartridge from the camera.

25. A camera according to claim 24, further comprising fourth means for cutting off a driving force transmitting function for transporting the image recording medium.

26. A camera according to claim 24, further comprising fourth means for cutting off a driving force transmitting function for returning the image recording medium to the cartridge.

27. A camera according to claim 23, further comprising third means for cutting off a driving force transmitting function for transporting the image recording medium.

28. A camera according to claim 23, further comprising third means for cutting off a driving force transmitting function for returning the image recording medium to the cartridge.

29. A camera according to claim 16, further comprising third means for cutting off a driving force transmitting function for at least one of moving the cartridge into the camera and removing the cartridge from the camera.

30. A camera according to claim 29, further comprising fourth means for cutting off a driving force transmitting function for transporting the image recording medium.

31. A camera according to claim 29, further comprising fourth means for cutting off a driving force transmitting function for returning the image recording medium to the cartridge.

32. A camera according to claim 16, further comprising third means for cutting off a driving force transmitting function for transporting the image recording medium.

33. A camera according to claim 32, further comprising means for automatically reinstating the driving force transmitting function cut off by said third means.

34. A camera according to claim 16, further comprising third means for cutting off a driving force transmitting function for returning the image recording medium to the cartridge.

35. A camera according to claim 34, further comprising means for automatically reinstating the driving force transmitting function cut off by said third means.

36. A camera adapted for use of an image recording medium cartridge having an image recording medium, comprising:
   a) an operating device which automatically performs at least one of loading the cartridge on the camera and removing the cartridge from the camera; and
   b) a permitting device for permitting at least one of loading the cartridge on the camera and removing the cartridge from the camera to be performed without using said operating device.

37. A camera according to claim 36, wherein the image recording medium includes a film.

38. A camera according to claim 36, wherein said operating device includes a motor.

39. A camera according to claim 36, wherein said operating device includes means for using electric energy as a drive source.

40. A camera according to claim 36, wherein said permitting device includes means for permitting an operation to be performed exteriorly of the camera.

41. A camera according to claim 36, wherein said permitting device includes means for permitting a manual operation.

42. A camera according to claim 36, further comprising third means for inhibiting an opening action on an opening part for removing the cartridge from the camera, and fourth means for rendering said third means incapable of inhibiting the opening action on said opening part.

43. A camera according to claim 36, wherein said permitting device includes means for cutting off a driving force transmitting function of said operation device.

44. A camera according to claim 43, further comprising third means for cutting off a driving force transmitting function for opening an opening part for putting the cartridge out from the camera.

45. A camera according to claim 44, further comprising fourth means for cutting off a driving force transmitting function for transporting the image recording medium of the cartridge.

46. A camera according to claim 44, further comprising fourth means for cutting off a driving force transmitting function for returning the image recording medium to the cartridge.

47. A camera according to claim 43, further comprising third means for cutting off a driving force transmitting function for transporting the image recording medium of the cartridge.

48. A camera according to claim 43, further comprising third means for cutting off a driving force transmitting function for returning the image recording medium to the cartridge.

49. A camera according to claim 36, further comprising third means for cutting off a driving force transmitting function for transporting the image recording medium of the cartridge.

50. A camera according to claim 49, further comprising means for automatically reinstating the driving force transmitting function cut off by said third means.

51. A camera according to claim 36, further comprising third means for cutting off a driving force transmitting function for returning the image recording medium to the cartridge.

52. A camera according to claim 51, further comprising means for automatically reinstating the driving force transmitting function cut off by said third means.

53. An apparatus adapted to an image recording medium cartridge, comprising:
   a) a cover for closing an opening part for removing said cartridge from the apparatus;
   b) a returning device which automatically returns an image recording medium to the cartridge which is loaded on the apparatus; and
   c) a setting device which sets state in which the image recording medium can be returned to the cartridge without using said returning device, said setting device inhibiting opening of said cover when said change device is not in said second state.

54. An apparatus adapted to an image recording medium cartridge having an image recording medium, comprising:
   a) an opening device which automatically opens an opening part for removing the cartridge from the apparatus; and
   b) an operation device which renders said opening part openable without using said opening device.

55. An apparatus adapted to an image recording medium cartridge having an image recording medium, comprising:
   a) an operating device which automatically performs at least one of loading the cartridge on the camera and removing the cartridge from the apparatus; and
   b) a permitting device which permits at least one of loading the cartridge on the apparatus and putting out the cartridge from the apparatus to be performed without using said operating device.

56. A unit adapted for at least one of a camera and an apparatus arranged to use an image recording medium cartridge, comprising:
   a) a cover for closing an opening part for removing the cartridge from at least one of the camera and the apparatus;
   b) a returning device which automatically returns an image recording medium to the cartridge which is loaded on at least one of the camera and the apparatus; and
   c) a setting device which sets a state in which the image recording medium can be returned to the cartridge without using said returning device, said setting device inhibiting opening of said cover when said change device is not in said state.

57. A unit adapted for at least one of a camera and an apparatus arranged to use an image recording medium cartridge having an image recording medium, comprising:
   a) an opening device which automatically opens an opening part for removing the cartridge from at least one of the camera and the apparatus; and
   b) an operation device which renders said opening part openable without using said opening device.

58. A unit adapted for at least one of a camera and an apparatus arranged to use an image recording medium cartridge having an image recording medium, comprising:
   a) an operating device which automatically performs at least one of loading the cartridge on at least one of the camera and the apparatus and removing the cartridge from at least one of the camera and the apparatus; and
   b) a permitting device which permits at least one of loading the cartridge on at least one of the camera and the apparatus and removing the cartridge from at least one of the camera and the apparatus without using said operating device.

59. A camera according to claim 36, wherein said operating device comprises a moving device which moves the cartridge so as to perform said at least one of loading and unloading the cartridge.

60. A camera according to claim 55, wherein said operating device comprises a moving device which moves the cartridge so as to perform said at least one of loading and unloading the cartridge.

61. A camera according to claim 58, wherein said operating device comprises a moving device which moves the cartridge so as to perform said at least one of loading and unloading the cartridge.

* * * * *